Dec. 30, 1941.  E. S. STANTON  2,268,312
PNEUMATIC TIRE WITH PRESSURE INDICATOR
Filed March 17, 1941
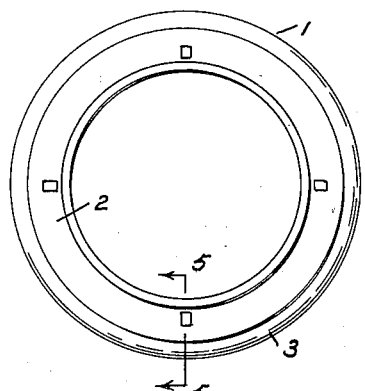
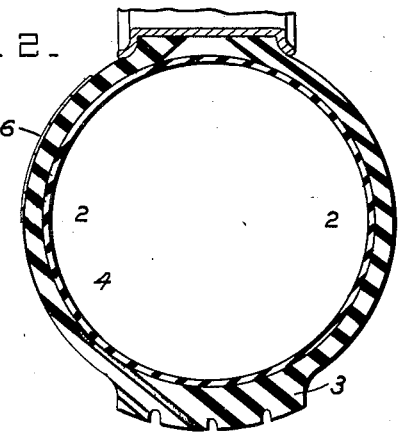
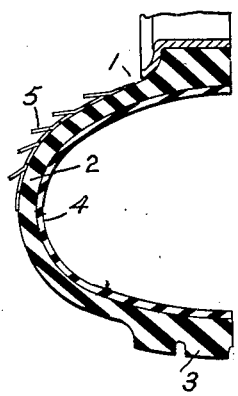
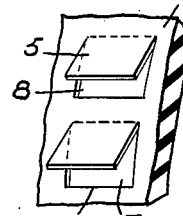
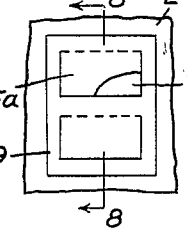
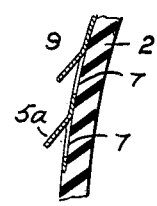
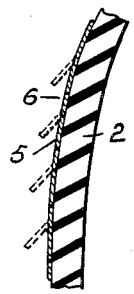
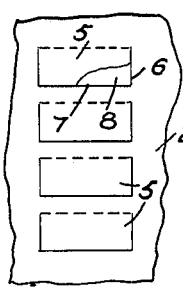
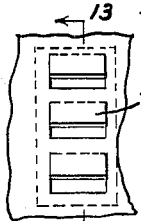
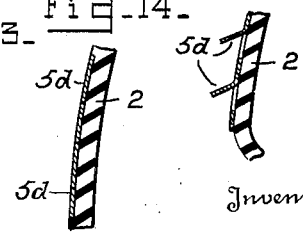
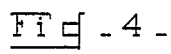
Inventor
Edwin S. Stanton
By *(signature)*
Attorney

Patented Dec. 30, 1941

2,268,312

UNITED STATES PATENT OFFICE 2,268,312

PNEUMATIC TIRE WITH PRESSURE INDICATOR

Edwin S. Stanton, Brooklyn, N. Y., assignor of one-half to Andrew J. Moran, Brooklyn, N. Y.

Application March 17, 1941, Serial No. 383,850

8 Claims. (Cl. 116—34)

My invention relates to pneumatic tires and particularly to a pneumatic tire provided with means for indicating the pressure in the tire.

It is often difficult for an automobilist to tell whether or not his tires are properly inflated without employing a pressure gage for the purpose. The use of such a gage requires the application of the gage to the inflating valve of each tire at a cost of some time and labor and the possible soiling of the hands of the person making the test. The use of indications or signals attached to the tire for the purpose of indicating under or over inflation has been suggested, but, so far as I am aware, none of these had ever come into practical use on account of their complexity, added cost, impracticability or other cause.

One object of my invention is to overcome these objections and difficulties and to provide a simple, reliable and efficient type of indicator adapted to be incorporated into a tire as part thereof when the tire is made or readily applicable to a tire in use at small expense for indicating whether or not the tire is properly inflated.

A further object of the invention is to provide a tire indicator which may be employed to indicate either under inflation or over inflation of the tire.

The invention consists of the features of construction, combination and arrangement of parts, hereinafter fully described and claimed, reference being had to the accompanying drawing, in which:

Fig. 1 is a side elevation of a pneumatic tire showing the same equipped with one form of pressure indicator embodying my invention.

Fig. 2 is a vertical section through one of the side walls of the tire showing the indicator as it appears when the pressure is normal or the tire properly inflated.

Fig. 3 is a view similar to Fig. 2 showing the indicator as it appears when the tire is under inflated.

Fig. 4 is a view in side elevation of a portion of the tire side wall and the indicator on an enlarged scale.

Fig. 5 is a section on line 5—5 of Fig. 1 showing the indicator flaps or vanes in normal position.

Fig. 6 is a perspective view of the portion of the tire wall appearing in Figs. 4 and 5, showing the indicator flaps or vanes in projected position.

Fig. 7 is a view similar to Fig. 4 showing a modification in the construction of the under inflation indicator.

Fig. 8 is a section on line 8—8 of Fig. 7.

Fig. 9 is a view similar to Fig. 4 showing another modification in the construction of the under inflation indicator.

Fig. 10 is a section on line 10—10 of Fig. 9 of the indicator shown therein as it appears in normal position.

Fig. 11 is a view similar to Fig. 10 showing the indicator operated to indicate under inflation.

Fig. 12 is a view similar to Fig. 4 showing the construction of an indicator for indicating over inflation when it occurs or both over inflation and under inflation.

Fig. 13 is a section on line 13—13 of Fig. 12 of the over inflation indication showing the flaps as they appear when the tire is normally inflated.

Fig. 14 is a view similar to Fig. 13 showing the indicator flaps as they appear when the tire is over inflated.

Fig. 15 is a view similar to Figs. 13 and 14 showing the indicator flaps as they appear when the tire is under inflated.

Referring now more particularly to the drawing, 1 represents a pneumatic vehicle tire, which may be of ordinary or any suitable type, said tire including side walls 2 and a tread 3. The tire encloses the usual inner tube 4 and in its construction may be formed of plies of material vulcanized together, or formed in any other suitable manner.

In the form of my invention shown in Figs. 1 to 6, inclusive, the tire is provided with an air pressure indicator upon the exterior of one of its side walls 2, said indicator consisting of one or more indicating vanes or flaps 5. These flaps 5 may comprise a part of the outer ply of the side wall, and each flap may be formed, as shown, by slitting the wall so as to produce a flap 5 of rectangular or other suitable shape. In the present instance the slits 6 are so arranged that the lower or free edges of the flaps face downwardly, and by such slitting openings 7 are formed in the plies which are normally closed by the flaps, that is to say, are closed by the flaps when the tire is normally inflated. These flaps 5 and their receiving openings 6 therefore lie normally in the plane of the outer ply of the side wall. The openings and flaps are positioned upon a portion of the wall 2 which bends from a normal condition shown in Fig. 2 outwardly, as shown in Fig. 3, when the tire is deflated or inflated to a degree below that intended in the normal running condition of the tire. When the tire becomes deflated, or the air pressure therein is reduced to a greater or less degree below normal, the wall 2 in bending outwardly, as shown in Fig. 3, causes an outward bending movement of the flaps 5, thus indicating that the tire is deflated and requires inflation to the proper pressure. If desired, the inner surfaces 8 of the openings, pockets or recesses 7 in which the flaps 5 fit when in closed condition, which surfaces are upon the outer face of the next adjacent ply of the tire wall, may be given a suitable indicating color, such as red, which will show prominently when the flaps 5 open to a greater or less extent. The degree to which the flaps 5 open will indicate the extent of deflation of the tire or amount of reduction of air pressure therein below normal running pressure. Fig. 5 shows in dotted lines and Fig. 6 in full lines in perspective the flaps 5 open to indicate under pressure.

Figs. 7 and 8 show a modified form of the invention in which the flaps 5a are formed upon and as part of a plate 9, which is slitted in the same manner as the outer ply of the wall 2 shown in Figs. 1 to 6, inclusive, to produce the flaps 5a and their receiving openings 7. The plate 9 may be vulcanized or otherwise secured to the outer wall 2 of the tire, but preferably, as shown in Figs. 7 and 8, is set within a recess formed in the outer ply of the tire wall 2 and vulcanized to said ply and to the adjacent inner ply. The plate 9 may be formed of the same material as the outer ply of the tire or of any other suitable flexible or resilient material and having a normal shape corresponding to that of the portion of the wall 2 on which it is fitted. The plate 9 will accordingly bend with the wall 2 so that the flaps 5a will function for an indicating action in the same manner as the flaps 5 disclosed in the structure shown in Figs. 1 to 6, inclusive. The structure shown in Figs. 7 and 8 may also include the color signal indicating portions 8, as will be readily understood.

Figs. 9, 10 and 11 show another modified form of my invention in which two cooperating and overlapping flaps 5b and 5c are employed to give a pressure indicating action. The flap 5b may comprise, as shown, a part of the outer ply of the tire wall 2, while the flap 5c is formed independently of the wall but secured thereto. As shown, the flap 5c is secured at its upper edge in any suitable manner, as indicated at 10, to the outer tire wall 2 and laps at its free edge over upon the adjacent portion of the flap 5b. In the lower or free overlapping portion of flap 5c is formed an observation or signal opening 11 and on the outer face of the flap 5b is a red color or other color indicator 12. When the tire is normally inflated the portion of the flap 5c in which the opening 11 is formed lies out of registry with the color indicator 12 and the flap 5c covers and conceals the same, but when the tire wall 2 bends downwardly in the manner shown in Fig. 3 a relative sliding as well as outward bending movement of the flaps is produced which causes a shifting of the flaps to bring the opening 11 into alinement with the color indicator 12 and expose the same therethrough. By this means an indication that the tire is under inflated or not normally inflated is given, so that this condition may be corrected. If desired, the opening 11 may be covered by a panel 11a of a thin waterproof transparent material through which the indicator 12 may be seen and which will prevent clogging of the opening 11 by sand or other foreign materials.

Figs. 12, 13, 14 and 15 show a construction of indicator designed to indicate over inflation of the tire. The construction of the parts here may be the same or substantially the same as that shown in Figs. 1 to 6, inclusive, except that the indicating flaps 5d are arranged to normally stand outwardly at an angle from the side wall 2 and the ply or the plate on which said flaps are formed. As long as these flaps extend outwardly at a normally predetermined angle, an indication is given that the tire is inflated to the proper degree. If, however, the tire should be over inflated to a greater or less degree, the wall 2 in straightening out as a result of over pressure will cause a partial or complete closure of the flaps 5d, indicating the fact that a greater or less degree of over pressure or over inflation exists. This construction of indicator also adapts it to serve as an underpressure indicator, as the flaps 5d will be bent out to a greater than normal angle, as shown in Fig. 15, when the wall 2 bends outward in the same manner as shown in Fig. 3, thus indicating that the tire is under inflated.

In practice, a plurality of the pressure indicators are preferably disposed on the side wall 2, at angles of 90° apart or any other suitable and desired angles of inclination, so that in any position of the tire one or more of the indicators will be promptly displayed to indicate whether or not the tire is properly inflated. The indicators used may be those serving solely to indicate under inflation, or independent indicators for respectively showing over and under inflation, or indicators of the type shown in Figs. 12, 13, 14 and 15 having these combined functions, so that the driver of the vehicle by merely inspecting the indicators upon his tire may be kept advised of the condition of inflation of the tire without the necessity of using pressure gages for the purpose.

From the foregoing description, taken in connection with the drawing, the construction and mode of operation of my improved tire pressure indicator will be readily understood and it will be seen that the invention provides a very simple, reliable and efficient means of this character for indicating to the vehicle driver the state or condition of pressure within his tires without the labor, annoyance and inconvenience of using pressure gages and liability of soiling the hands in so doing. The indicators, as shown, are adapted to be manufactured so that proper indicators for any size of tire may be purchased by the user of a vehicle and applied for use to his tires. The indicators may also, as shown, be of a form adapted to be incorporated into the tire as a component part thereof by the manufacturer of a tire while the tire is being built. The advantages of my improved pressure indicator will, therefore, be readily apparent to the users of vehicles and others versed in the art without a further and extended description. While the constructions shown are preferred, it will, of course, be understood that changes in the form, proportions and details of construction, other than those shown, may be made within the scope of the appended claims, without departing from the spirit or sacrificing any of the advantages of the invention.

Also it is to be understood that while I have shown and described my invention as adapted particularly for use in connection with pneumatic tires it will be apparent that it also may be used in connection with other pneumatic devices or inflated bodies for the purpose of indicating the pressure of fluids stored therein, and whether or not the fluid stored is above or below a predetermined, normal or desired pressure.

What I claim is:

1. A pneumatic tire having a side wall provided with an air pressure indicator formed integral therewith including an outer ply having an opening formed therein and an inner ply bearing a color indication to be displayed through the opening, said plies being normally relatively arranged to dispose the opening and color indication out of alinement and so connected in said side wall as to cause relative movement between said opening and said color indication to bring them into alinement on a bending of the tire wall on a change of air pressure from normal to abnormal within the tire.

2. A pneumatic tire provided with an air pressure indicator comprising a side wall portion including a ply integral with and forming a component part of said wall, said ply having an opening therein, and a flap hinged to the ply and disposed so as to be movable with relation to said opening by the bending of the wall from a position indicating normal pressure to a position indicating abnormal pressure, said flap being integral at one of its margins with the ply and separated from the ply along its remaining margins, said margins defining the walls of the opening.

3. A pneumatic tire having a side wall provided with an air pressure indicator formed integral therewith including an outer ply having an opening therein, an inner ply bearing a color indication to be displayed through the opening, and a vane or flap carried by the outer ply and movable with relation to said opening and color indication to give an air pressure indication on a bending of the tire wall on a change of air pressure from normal to abnormal within the tire.

4. A pneumatic tire having a side wall provided with an air pressure indicator formed integral therewith including an outer ply having an opening therein and an inner ply bearing a color indication to be displayed through the opening, and a hinged vane or flap carried by the outer ply and normally arranged to cover the opening and conceal the color indication and movable with relation to said opening and color indication on a bending of the wall on a change of air pressure from normal to abnormal within the tire to expose the color indication, said vane or flap being integral with the outer ply and formed conjointly with the opening of material displaced in the formation of the opening by slitting said ply.

5. A pneumatic tire having a side wall provided with an air pressure indicator formed integral therewith including a ply having an indicator opening formed therein, and a hinged vane or flap on said ply normally closing the opening and movable to expose the opening to give thereby a pressure indication on a bending of the tire wall under a change of air pressure from normal to abnormal within the tire.

6. A pneumatic tire having a side wall provided with an air pressure indicator including a member having an opening therein and a member bearing a color indication to be displayed through the opening, said members being normally relatively arranged to dispose the opening and color indication out of alinement and being so connected in said side wall as to cause relative movement between said opening and said color indication to bring them into alinement on a bending of the tire wall on a change of air pressure from normal to abnormal in the tire, at least one of said members being integral with the tire and comprising a constituent ply of the tire wall.

7. A pneumatic tire having a side wall provided with an air pressure indicator formed integral therewith including a ply having an indicator opening formed therein, and a hinged vane or flap on said ply normally closing the opening and movable to expose the opening on a bending of the tire wall under a change of air pressure within the tire.

8. A pneumatic tire having a side wall provided with an air pressure indicator including a member having an opening therein and a member bearing a color indication to be displayed through the opening, said members being normally relatively arranged to dispose the opening and color indication out of alinement and so connected in said side wall as to cause relative movement between said opening and said color indication to bring them into alinement on a bending of the tire wall on a change of air pressure from normal to abnormal in the tire, at least one of said members being integral with the tire and comprising a constituent ply of the tire wall.

EDWIN S. STANTON.